Oct. 11, 1966  A. J. TAYLOR ETAL  3,277,958
HEAT EXCHANGERS
Filed Nov. 22, 1963  3 Sheets-Sheet 1

INVENTORS
Anthony J. Taylor
Ronald J. Hawkins
BY
ATTORNEY

Oct. 11, 1966            A. J. TAYLOR ETAL            3,277,958
                            HEAT EXCHANGERS
Filed Nov. 22, 1963                              3 Sheets-Sheet 2
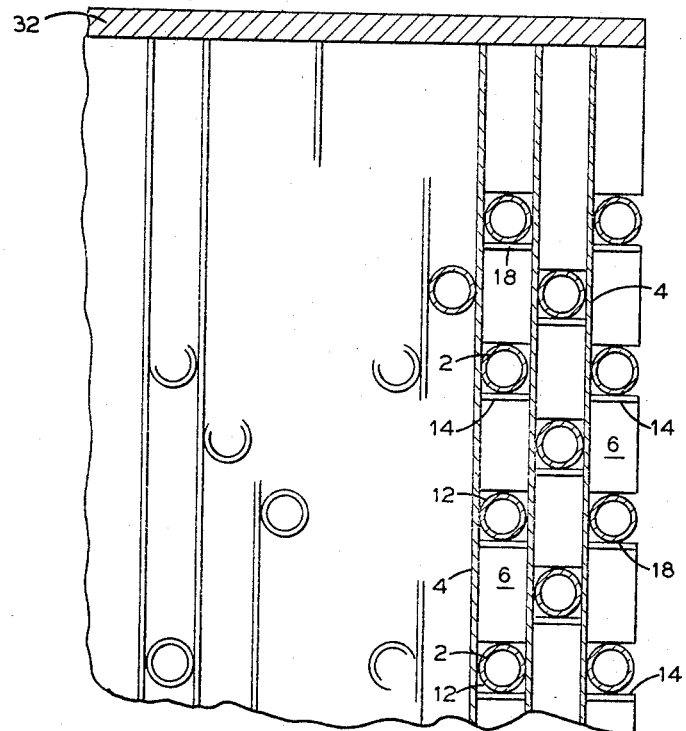
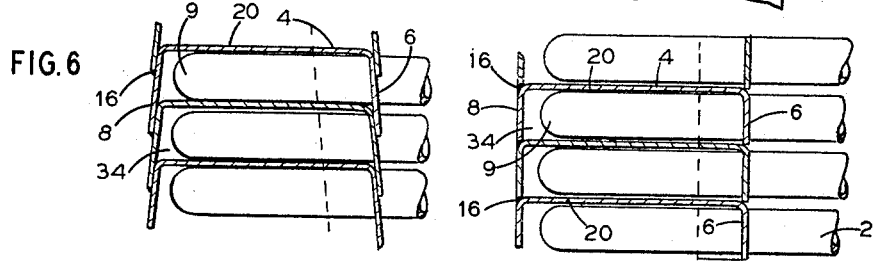
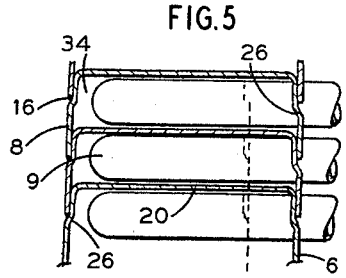
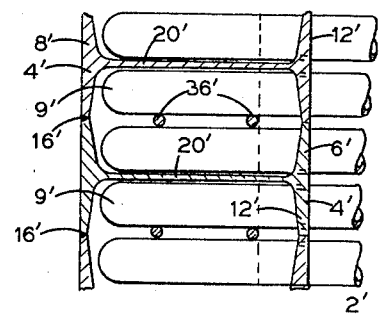

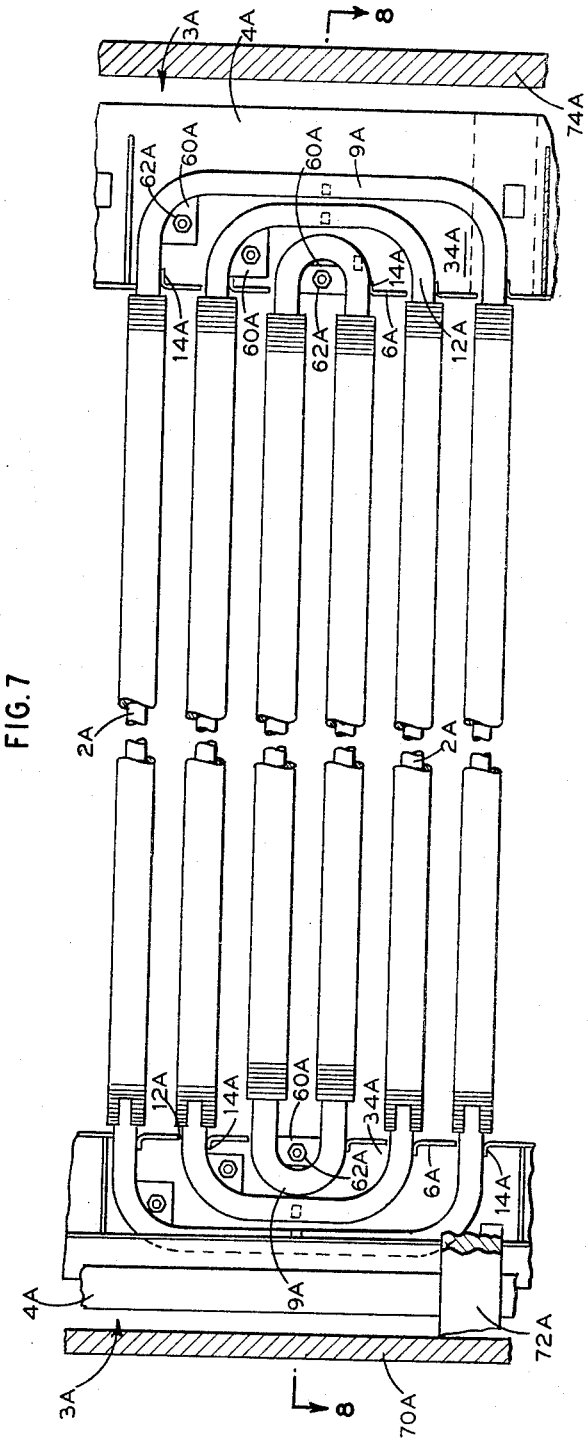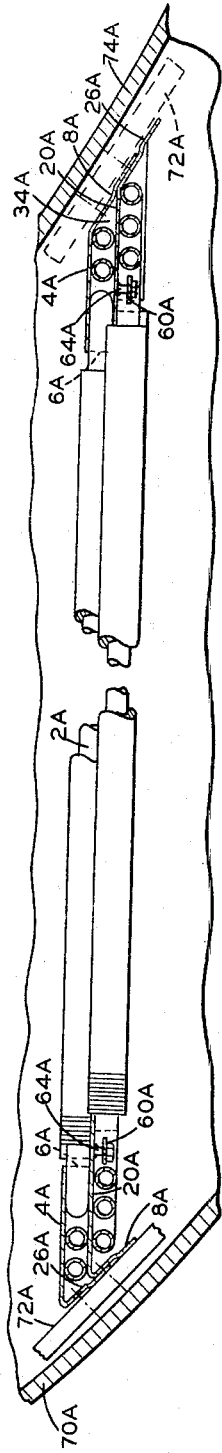

United States Patent Office 3,277,958
Patented Oct. 11, 1966

3,277,958
HEAT EXCHANGERS
Anthony J. Taylor and Ronald J. Hawkins, London, England, assignors to Babcock & Wilcox Limited, London, England, a corporation of Great Britain
Filed Nov. 22, 1963, Ser. No. 325,669
Claims priority, application Great Britain, Nov. 27, 1962, 44.820/62
9 Claims. (Cl. 165—145)

This invention relates to tubulous heat exchangers and is concerned with improved casing means.

A tubulous heat exchanger according to the present invention has a bank of sinuous tubes extending between two opposed fluid-tight walls each of which is constituted by flanged plates having inner and outer edge flanges respectively disposed inwardly and outwardly of return bends of the tubes, the inner edge flanges being apertured to permit passage of the tubes and the flanged plates incorporating means to support the tubes whilst adjacent flanged plates are united to one another in a fluid tight manner at an outer flange or outer flanges.

The invention also includes an integral nuclear reactor including a nuclear reactor core contained within a pressure vessel between which and the core is an annular space containing banks of heat exchange tubes of involute form, the end walls of each bank of tubes being formed of flanged plates having inner and outer edge flanges respectively disposed inwardly and outwardly of return bends of the tubes and having the outer flanges of the radially outer and inner walls substantially parallel respectively to a plane tangent to the surface of the pressure vessel at the central part of the outer wall and a plane tangent to the surface of a baffle enclosing the core at the central part of the inner wall.

The invention will now be described, by way of example, with reference to the accompanying partly diagrammatic drawings in which:

FIGURE 3 is a fragmentary section taken on the line 3—3 of FIGURE 2 and looking in the direction of the arrows;

FIGURE 4 is a sectional plan view taken on the line 4—4 of FIGURE 2;

FIGURE 5 is a sectional plan view similar to FIGURE 4 but depicting a modification;

FIGURE 6 is a sectional plan view depicting another modification;

FIGURE 7 is a sectional front elevation of a modification showing the side portions of a heat exchanger casing and depicting parts of tube limbs and return bends;

FIGURE 8 is a sectional plan view taken on the line 8—8 of FIGURE 7; and

FIGURE 9 is a sectional plan view depicting a modified form of construction of a side portion of heat exchanger casing and parts of tube limbs and return bends.

Figure 1:
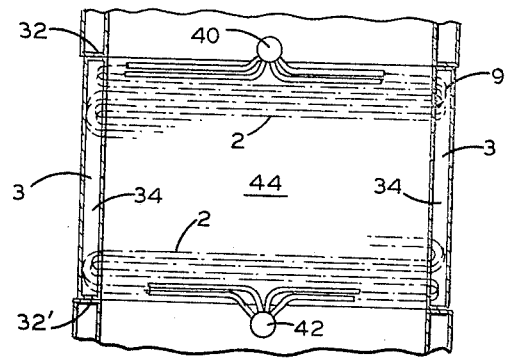
FIGURE 1 is a schematic arrangement of the heat exchanger tubes disposed within a casing.
Figure 2:
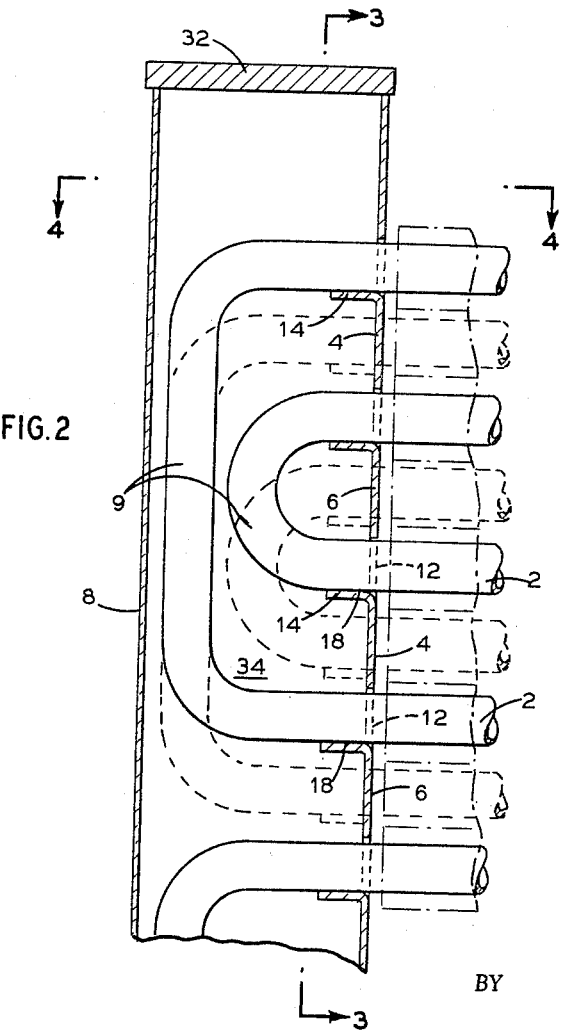
FIGURE 2 is a sectional front elevation of a side portion of the heat exchanger casing and depicting parts of tube limbs and return bends.

Referring to FIGURES 1 to 4 of the drawings, the tubulous heat exchanger has a bank of sinuous tubes 2 disposed within an upright gas pass 44 of rectangular cross-section and formed with horizontal limbs extending between two opposed fluid tight walls 3 each of which is constituted by flanged plates 4 of channel section having main walls 20 and inner and outer flanges 6 and 8 respectively disposed inwardly and outwardly of return bends 9 of the tubes 2 and spaces 34 containing the return bends. The depth of the flanges at their inner surfaces is slightly greater than the diameter of the heat exchanger tubes 2 so that the tubes are located between the main walls 20 of the adjacent plates. The spaces 34 are closed above and below by plates 32 and 32' respectively and the gas pass is completed by walls of suitable construction extending between the walls 3.

At their ends, the flanged plates 4 are welded at their inner and outer flanges 6 and 8 to the cover plates 32 and 32' and the endmost flanged plates are welded to elements of the side walls (not shown) which extend between the opposed walls formed by the flanged plates to define the heating fluid pass 44 containing the tube bank. Such additional or side walls may be of any suitable construction but may appropriately be of steel plate stayed by reinforcing members of I-section.

The tube limbs of the tube bank in adjacent rows transversely of the heating fluid pass 44 are staggered and the tubes are connected to an inlet header 40 and an outlet header 42 centrally spaced in relation to the pass 44 and extending parallel to the walls 3 formed of the flanged plates 4. The tube limbs 2 in each row parallel to the heating fluid pass are formed of two tubes extending from each header in opposite directions. The return bends 9 of the two tubes are in nested relationship the nested return bends of each tube being alternately an outer bend and an inner bend.

The inner flange 6 of each plate 4 is provided with apertures 12 to permit the passage of respective tube limbs and with tongues 14 for supporting the tubes 2 whilst adjacent flanged plates 4 at their outer flanges 8 are united to one another by seal welds 16.

The tongues 14 are formed by dividing the metal of the inner flange 6 transversely and longitudinally adjacent the main wall of the flanged plate and bending the tongues 14 inwardly to afford seatings 18 for the tubes 2.

The flanged plates are pressed from sheet steel and the corners between the flanges and the main walls 20 of the flanged plates 4 are rounded so that where the edge of an outer flange 8 abuts against an adjacent flanged plate, there is a recess which constitutes a groove for the seal weld 16.

During assembly the tubes 2 and the pairs of flanged plates 4 for the support of the tubes are built up in layers, and when each layer has been assembled, the flanged plates of the opposed walls 3 are seal welded as shown at 16 at their outer edge flanges to the preceding flanged plates.

In the modification, illustrated by FIGURE 5, the plates are formed with flanges 6 and 8 which are intermediate locations 26 in the widths thereof are joggled outwardly so that the flanges of a plate near their edges embrace the flanges of an adjacent plate near their roots.

With this arrangement the position of one flanged plate 4 in relation to an adjacent flanged plate can be adjusted within limits prior to the welding operation, thus affording a useful tolerance for manufacture and assembly.

In the modification of FIGURE 6 the plates 4 are formed with flanges 6 and 8 which are inclined towards their edges away from one another so that the flanges of a plate near their edges embrace the flanges of an adjacent plate near their roots. Instead of being inclined from their roots outer parts only of the flanges may be inclined from their edges away from one another. Again a degree of latitude in assembly is afforded since a flanged plate can be pressed to a greater or less extent onto the adjacent flanged plate.

In the modified construction of FIGURES 7 and 8 the flanged plates 4A of channel section of one of the walls 3A have their outer flanges 8A inclined from their roots towards the inner flanges and substantially parallel to a plane tangent to the surface of a pressure vessel wall 70A or a baffle member at the central part of the outer wall. In the opposite wall of the outer flanges 8A are inclined from their roots away from the inner flanges 6A and are substantially parallel to a plane tangent to the surface of a baffle 74A, enclosing a nuclear reactor core (not shown), at the central part of the inner wall. Between the pressure vessel wall 70A and the baffle 74A is an annular space containing banks of heat exchange tubes 2A of involute form. The outer flanges in both the walls are held together by tie members 72A fastened to respective outer flanges 8A. The outer flanges 8A in both the walls at intermediate parts 26A are joggled outwardly so that the outer flange of a plate near its edge can embrace a part of the flange of the adjacent plate near its root. The inner flange 6A of each plate is provided with apertures 12A to permit the passage of respective tube limits 2A and with tongues 14A for supporting the tubes while the outer flanges 8A are united to one another by seal welds. Return bends 9A of the tubes 2A are contained in spaces 34A of the plates 4A and are secured to main walls 20A of the plates 4A by fastening means formed of flat connecting members 60A welded to return bends 9A and having slotted openings 62A formed with slots having its major axis parallel to the tube limbs of the bank to permit the entry of respective studs 64A. Each stud is at one end welded to the main wall 20A of a plate 4A and at its opposite end is provided with a nut 66A engaging the connecting member 60A. In such an arrangement of the flanged plates 4A, the position of one flanged plate 4A in relation to an adjacent flanged plate can be adjusted within limits prior to the welding operation so that a rigid and fluid tight wall is formed capable of withstanding substantial pressure difference.

In the modified construction of FIGURE 9 the plates 4' are of I-section and abutting outer flanges 8' of adjacent plates are seal welded together at 16'. The inner flanges 6' of adjacent plates are in abutting relationship and are provided with apertures 12' to permit the passage of tube limbs and with tongues for supporting the tubes. In this construction return bends 9' associated with two rows of tube limbs 2' are located between the webs or main walls 20' of each pair of adjacent flanged plates and spacing means are provided for laterally spacing the two sets of the return bends 9'. Such spacing means are suitably constituted by rods 36 extending within the respective spaces 34' between the pairs of return bends and suspended from a top plate similar to the top plate 32 of FIGURE 1 closing the spaces 34' between the inner and outer flanges 6' and 8'.

The spaces 34 between the inner and outer flanges 6 and 8 at the wall 3 are in communication with the heating fluid pass so that heating fluid from the pass 44 can flow through the spaces. In this way approximate equality of temperature between the inner and the outer flanges is ensured and some degree of heat transfer to the return bends may be obtained. If desired, additional provision for the passage of heating fluid into and out of the said spaces 34 may be provided.

The width of the flanged plate 4 in the embodiments shown is several times the depth of the flanges and the constructions described enables a rigid and fluid-tight wall capable of withstanding substantial pressure difference and having integral tube supporting means to be provided with an economy of space and metal. Moreover, the tube bank together with the walls locating the tubes may be assembled under shop conditions and transported as a unit to a remote site for use thereat.

In the embodiments described the tube limbs of the tube banks in adjacent rows transversely of the heating fluid are staggered. Alternatively, the tube limbs may be disposed having an in-line arrangement.

The tube bank is, for example, disposed within a pressure vessel (not shown) the heating fluid pass 44 being traversed by coolant from a nuclear reactor.

What we claim is:

1. A tubular heat exchanger comprising a wall, and a bank of sinuous tubes having return bends at their end portions adjacent said wall, said wall comprising a plurality of flanged plates, each of which includes an inner and outer flange portion respectively disposed inwardly and outwardly of said return bends, said inner flange portion including means forming an opening therein through which is received one of said tubes for the support thereof, the outer flange portion of each plate being connected along its length to an adjoining plate adjacent the outer flange portion thereof.

2. A tubular heat exchanger comprising a pair of opposed walls, and a bank of sinuous tubes extending between said walls and having return bends at their end portions adjacent said walls, each of said walls comprising a plurality of contiguous flanged plates, each of which includes a web and an inner and outer flange respectively disposed inwardly and outwardly of said return bends, said plates being aligned so that the webs of the adjoining plates in each wall are in substantially parallel planes, said inner flanges including means forming openings therein through which are received said tubes, said tubes being supported on the edges of said openings, the outer flange of each of the plates in each wall being connected along its length to its adjoining plate at a location adjacent the outer flange thereof.

3. A tubular heat exchanger comprising a pair of opposed substantially parallel fluid-tight walls which form the boundary of a heating fluid pass, and a bank of sinuous multilooped tubes extending between said walls and having return bends at their end portions adjacent said walls, each of said walls comprising a plurality of upright contiguous flanged plates of channel-shaped cross-section, each of which includes a web and an inner and outer flange respectively disposed inwardly and outwardly of the return bends adjacent one of said walls, said plates being aligned so that the webs of adjoining plates in each wall are in substantially parallel planes and the outer flanges of adjoining plates collectively form a substantially planar surface, said inner flanges having portions thereof displaced to form openings therein through which are received said tubes, said tubes being supported on the edges of said openings, the outer flange of each of the plates in each wall being connected along its length in a fluid-tight manner to its adjoining plate at a location adjacent the outer flange thereof.

4. A tubular heat exchanger comprising a pair of opposed fluid-tight walls, and a bank of sinuous tubes extending between said walls and having return bends at their end portions adjacent said walls, each of said walls comprising a plurality of contiguous flanged plates of generally channel-shaped cross-section, each of which includes a web and an inner and outer flange respectively disposed inwardly and outwardly of said return bends, said plates being aligned so that the webs of adjoining plates in each wall are in substantially parallel planes, the inner and outer flanges of each of said plates being inclined toward their edges away from each other, said inner flanges including means forming openings therein through which are received said tubes, said tubes being supported on the edges of said openings, the outer flanges of each of the plates in each wall being connected along its length in overlapping relationship to the flange of its adjoining plate.

5. A tubular heat exchanger comprising a pair of opposed fluid-tight walls, and a bank of sinuous tubes extending between said walls and having return bends at their end portions adjacent said walls, each of said walls comprising a plurality of contiguous flanged plates of generally channel-shaped cross-section, each of which includes a web and an inner and outer flange respectively disposed inwardly and outwardly of said return bends, said plates being aligned so that the webs of adjoining plates in each wall are in substantially parallel planes, the inner and outer flanges of each of said plates being joggled outwardly at locations intermediate their width, said inner flanges including means forming openings therein through which are received said tubes, said tubes being supported on the edges of said openings, the outer flange of each of the plates in each wall being connected along its length in overlapping relationship to the flange of its adjoining plate.

6. A tubular heat exchanger comprising a pair of opposed fluid-tight walls, and a bank of sinuous tubes extending between said walls and having return bends at their end portions adjacent said walls, each of said walls comprising a plurality of contiguous members of I-shaped cross-section, each of which includes a web and an inner and outer flange respectively disposed inwardly and outwardly of said return bends, said members being aligned so that the webs of adjoining members in each wall are in substantially parallel planes, and the outer flanges of adjoining members in each wall are in abutting relationship so as to collectively form a substantially planar surface, said inner flanges including means forming openings therein through which are received said tubes, said tubes being supported on the edges of said openings, the outer flange of each of the members in each wall being connected along its length to the flange of its adjoining member.

7. A tubular heat exchanger comprising a pair of upright opposed fluid-tight walls which form the boundary of a heating fluid pass, and a bank of sinuous multilooped tubes extending between said walls and having return bends at their end portions adjacent said walls, said tubes being arranged for the parallel flow of fluid between a pair of elongated headers disposed within said fluid pass respectively above and below said bank of tubes and having their longitudinal axes substantially parallel with the plane of said walls, each of said walls comprising a plurality of upright contiguous flanged plates of channel-shaped cross-section, each of which includes a web and an inner and outer flange respectively disposed inwardly and outwardly of the return bends adjacent one of said walls, said plates being aligned so that the webs of adjoining plates in each wall are in substantially parallel planes and the outer flanges of adjoining plates collectively form a substantial thereof displaced to form openings therein through which are received said tubes, said tubes being supported on the edges of said openings, the outer flange of each of the plates in each wall being connected along its length in a fluid-tight manner to its adjoining plate at a location adjacent the outer flange thereof.

8. In an annular space through which a fluid medium is circulated, said space being bounded by a pair of curved walls, a tubular heat exchanger disposed within said annular space and including a bank of sinuous multilooped heat exchange tubes extending between said walls and having return bends at their end portions adjacent said walls, and means associated with each of said walls for connecting said tubes to said walls for the support of said tubes comprising a plurality of flanged plates, each of which includes an inner and outer flange portion respectively disposed inwardly and outwardly of said return bends, said outer flange portions being substantially parallel to a plane tangent to the adjacent curved wall surface, said inner flanged portion including means forming openings therein through which are received individual ones of said tubes.

9. The combination according to claim 8 wherein said pair of curved walls are a circular outer wall and a concentrically disposed inner wall, and said tubes are of involute form.

References Cited by the Examiner
UNITED STATES PATENTS

| | | | |
|---|---|---|---|
| 2,278,086 | 3/1942 | Lea | 165—163 X |
| 2,923,279 | 2/1960 | Schmidli | 122—510 |
| 3,060,909 | 10/1962 | Ott | 122—510 |
| 3,150,051 | 9/1964 | Ammon | 176—61 |
| 3,163,585 | 12/1964 | Metcalfe et al. | 176—65 |

ROBERT A. O'LEARY, *Primary Examiner.*

L. DEWAYNE RUTLEDGE, *Examiner.*

T. W. STREULE, JR., *Assistant Examiner.*